(12) United States Patent
Engl et al.

(10) Patent No.: US 9,141,220 B2
(45) Date of Patent: Sep. 22, 2015

(54) DEVICE FOR DETECTING AND DISPLAYING MOVEMENTS

(75) Inventors: Walter Engl, Feldkirchen-Westerham (DE); Alexander Jarczyk, Freising (DE); Matthias Schneider-Hufschmidt, München (DE)

(73) Assignee: QUALCOMM Incorporated, San Diego, CA (US)

( * ) Notice: Subject to any disclaimer, the term of this patent is extended or adjusted under 35 U.S.C. 154(b) by 1500 days.

(21) Appl. No.: 10/499,763

(22) PCT Filed: Dec. 3, 2002

(86) PCT No.: PCT/EP02/13672
§ 371 (c)(1),
(2), (4) Date: Jun. 21, 2004

(87) PCT Pub. No.: WO03/054781
PCT Pub. Date: Jul. 3, 2003

(65) Prior Publication Data
US 2005/0017966 A1   Jan. 27, 2005

(30) Foreign Application Priority Data
Dec. 21, 2001 (EP) .................................. 01130738

(51) Int. Cl.
*G06F 7/00* (2006.01)
*G06F 3/041* (2006.01)
*G06F 1/16* (2006.01)
*G06F 3/0354* (2013.01)

(52) U.S. Cl.
CPC .............. *G06F 3/0412* (2013.01); *G06F 1/169* (2013.01); *G06F 1/1626* (2013.01); *G06F 1/1694* (2013.01); *G06F 3/03544* (2013.01); *G06F 2200/1614* (2013.01); *G06F 2200/1637* (2013.01)

(58) Field of Classification Search
CPC ..... G02B 19/0085; G06F 3/0233; G06F 3/14; G09G 2354/00; H04N 2007/145; H04N 5/23258
USPC .................................. 707/1–104.1, 690, 758
See application file for complete search history.

(56) References Cited

U.S. PATENT DOCUMENTS 3,987,459 A * 10/1976 Cammarota .................. 396/561
4,695,833 A *  9/1987 Ogura et al. ................ 345/440.1
4,790,024 A * 12/1988 Peppers et al. ................ 382/214

(Continued)

FOREIGN PATENT DOCUMENTS

EP  0 957 488   11/1999
FR  2 788 151    7/2000

(Continued)

*Primary Examiner* — Jeffrey A Burke
*Assistant Examiner* — Linh Black
(74) *Attorney, Agent, or Firm* — Norton Rose Fulbright US LLP

(57) ABSTRACT

The invention relates to a device for detecting and displaying movements, whereby the device comprises a housing and position detection means, which are placed on the housing and provided for detecting the current position data of a reference point of the device. The inventive device also comprises data processing means for processing position data detected by the position detection means, and comprises a display device, which is provided on the housing while serving to display an image consisting of detected and processed position data.

25 Claims, 2 Drawing Sheets

(56) References Cited

U.S. PATENT DOCUMENTS

| | | | |
|---|---|---|---|
| 4,845,766 A * | 7/1989 | Peppers et al. | 382/214 |
| 5,430,334 A * | 7/1995 | Meister | 307/10.1 |
| 5,523,775 A * | 6/1996 | Capps | 345/179 |
| 5,703,623 A * | 12/1997 | Hall et al. | 345/158 |
| 5,757,360 A * | 5/1998 | Nitta et al. | 345/156 |
| 5,793,310 A * | 8/1998 | Watanabe et al. | 340/995.14 |
| 5,822,230 A * | 10/1998 | Kikinis et al. | 708/109 |
| 5,889,888 A | 3/1999 | Marianetti, II et al. | |
| 6,067,436 A * | 5/2000 | Kohno et al. | 399/303 |
| 6,091,030 A * | 7/2000 | Tagawa et al. | 178/18.01 |
| 6,244,970 B1 * | 6/2001 | Sullivan et al. | 473/53 |
| 6,259,990 B1 * | 7/2001 | Shojima et al. | 701/209 |
| 6,647,145 B1 * | 11/2003 | Gay | 382/187 |
| 6,801,190 B1 * | 10/2004 | Robinson et al. | 345/173 |
| 6,983,420 B1 * | 1/2006 | Itou et al. | 715/723 |
| 7,028,899 B2 * | 4/2006 | Tsikos et al. | 235/462.01 |
| 7,100,195 B1 * | 8/2006 | Underwood | 726/2 |
| 7,105,753 B1 * | 9/2006 | Lapstun et al. | 178/19.05 |
| 2001/0022585 A1 * | 9/2001 | Endo et al. | 345/427 |
| 2001/0055062 A1 * | 12/2001 | Shioda et al. | 348/79 |
| 2002/0024500 A1 * | 2/2002 | Howard | 345/158 |
| 2002/0080239 A1 * | 6/2002 | Ikeda et al. | 348/207 |
| 2002/0135565 A1 * | 9/2002 | Gordon et al. | 345/169 |
| 2002/0145042 A1 * | 10/2002 | Knowles et al. | 235/462.01 |
| 2003/0061188 A1 * | 3/2003 | Wiebe et al. | 707/1 |
| 2003/0076408 A1 * | 4/2003 | Dutta | 348/61 |
| 2005/0022114 A1 * | 1/2005 | Shanahan et al. | 715/513 |
| 2005/0117912 A1 * | 6/2005 | Patterson et al. | 398/135 |

FOREIGN PATENT DOCUMENTS

| | | |
|---|---|---|
| WO | WO 01/03054 | 1/2001 |
| WO | WO 01/43473 | 6/2001 |
| WO | WO-03054781 A1 | 7/2003 |

* cited by examiner

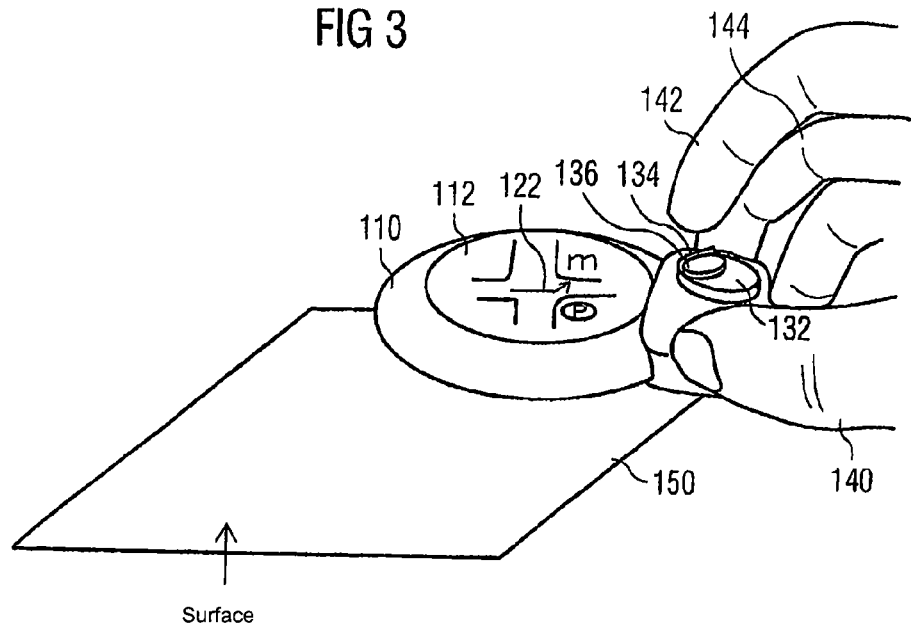
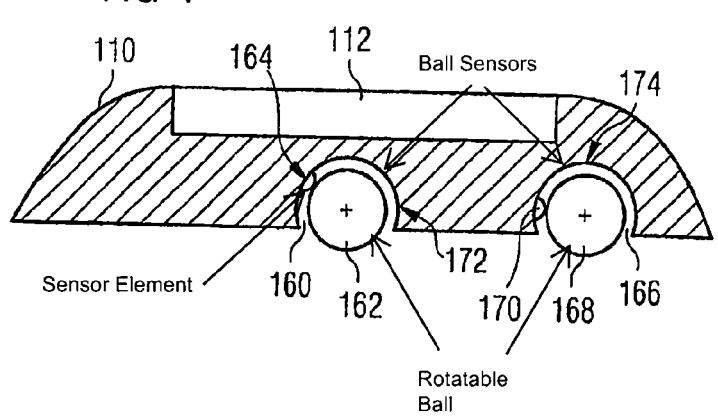

DEVICE FOR DETECTING AND DISPLAYING MOVEMENTS

BACKGROUND OF THE INVENTION

Devices of this type are generally known from the prior art. For example, virtually all computer desktop applications today employ what is termed a computer mouse via which a computer's graphical user interface displayed on an external monitor can be controlled. To detect movement, computer mice of this type have, for instance, a ball housed in a socket on their underside. Such ball rotates when the mouse is moved by the user, this movement then being conveyed to the computer by way of ball sensors inside the mouse.

Instead of mechanical movement detection by way of a ball, other types of computer mice employ optical sensors. In this case, conclusions are drawn about the mouse's movement by, for example, measuring the light scattered or reflected on the base on which the mouse is moved, the relevant data being conveyed to a computer via a cable.

The movement data is generally conveyed from the computer mouse to the computer via a cable. Embodiments are, however, also known in which the movement data is conveyed to a computer on a wireless basis.

The use of a graphical user interface, as has come to prevail in conventional computer applications, generally necessities being able to freely access any locations on the monitor display. As already mentioned, this is achieved in most desktop applications through use of a mouse. This type of solution is not, however, desired in the case of portable devices, users generally not wishing to carry around separate operating accessories for their devices. This problem is resolved in the case of, for instance, known Personal Digital Assistants (PDAs) or small, what are termed hand-held computers (palmtops), by way of a pen which is kept in the device and taken from it when needed. The disadvantage of this design is that the pen is easily lost as a result of, for example, falling out of its holder or being put to one side while the user is working and then being forgotten. Both hands are furthermore needed to operate this device. This is in many cases undesirable, particularly where mobile applications are concerned.

A further possibility for moving the active point on a graphical user interface is to attach keys specially provided to the device for the purpose of operating such keys. That solution is generally very cumbersome as very many key actuations are required in order to move from one side of the display to another. The possibility of quickly moving the active point on a graphical user interface to any location on the monitor is, however, the very prerequisite for making efficient use of an interface of this type.

The detecting of graphics or handwriting is gaining increasingly in significance as a further possibility for entering data. The above-mentioned computer mouse has also proved its worth in this regard in the case of permanently installed computer systems. This possibility is employed by numerous conventional computer-controlled graphics applications.

Drawings and handwriting likewise can be detected in the case of the mobile devices cited which, like PDAs or palmtops, are controlled by way of a separately included pen, but with the disadvantage already mentioned above of requiring the use of both hands for making entries and the risk of losing the pen, after which the system will be virtually unusable until a replacement pen has been obtained.

The detecting of graphics or handwriting is virtually impossible in the case of devices on which, as mentioned above, special keys are used for controlling.

The present invention is, therefore, directed toward a system in which graphical data, or data required for use, is detectable by way of manual movements and which is suitable for single-handed operation.

SUMMARY OF THE INVENTION

This is achieved by the present invention by way of a device for detecting and displaying movements, the device including: a housing, position detection parts attached to the housing and provided for detecting the current position data of a reference point of the device, a data processor for processing position data detected by the position detection parts, and a display facility provided on the housing and serving to display an image consisting of detected and processed position data.

The device enables for the first time the movement-induced detecting of data with the simultaneous displaying of the data or the induced actions on the display facility located on the device. The display facility can be, for example, a liquid crystal display (LCD) or an electroluminescent display (involving the use of, for instance, organic or inorganic semiconductors or electroluminescent color dyes). The device combines, for example, the known advantages of the cited computer mouse for entering graphical data or handwriting and controlling a graphical user interface with the possibility of operating a corresponding device with only one hand.

Before the device according to the present invention is used, it may need to be put into an active, which is to say operable, condition by electrically powering it by, for example, turning on a power supply or inserting a battery. Within the scope of this application it is assumed in the description of the device that it is in such an operable condition.

When the device is moved, the position data of the locations which the reference point traverses during the movement is registered by the position detection parts, for example by sensors specified in more detail below, and is processed by the data processor, for example by one or more microprocessors, a small computer, or a PC. Depending on the type of data being entered, the data can be displayed on the display facility provided on the housing in the form, for instance, of a graphical representation of the movement and/or of a movement of an active area of the user interface relative to the user interface. The expression "active area of a user interface" is understood to be the area via which specific actions or activities of the user interface are initiated. The area is customarily shown by way of, for example, an arrow, a pointing hand, or something of a similar nature.

In an embodiment of the present invention the position detection parts provided on the housing can include an optical sensor and/or a mechanical sensor and/or an acceleration sensor. As the sensors each possess specific characteristics, it also can be of practical advantage to combine them in certain circumstances. For example, an optical sensor can be used for detecting the reference point's translational movement.

In contrast to fixed display facilities, such as a monitor, it can be advantageous in the case of a display facility according to the present invention which is moved along with the housing for a rotation of the device also to be detected. It may, for example, be desirable for the orientation of the information shown on the display facility to remain unchanged relative to the user even when the device is rotated. This would avoid, for instance, users' having to follow the rotation with their eyes when looking at the display. An optical sensor, for example, also can be used for detecting a rotational movement around an axis extending through the reference point.

Two optical sensors, for example, can be provided on the housing in order to detect both a translational and a rotational movement of the device.

Inter alia, one or more of the ball sensors known from the computer mouse also can, of course, be used use detecting the device's movement. Owing to their comparatively simple structural design, such sensors have the advantage, for example, of being economical in terms of cost.

The situation may arise, particularly when the device is in mobile use, of there being no suitable surface available for working with the device designed using optical or mechanical sensors. To counter such a problem, provision can be make for employing one or more acceleration sensors for detecting the movement of the reference point. Such sensors can be embodied in the form of, for example, a rotation-angle acceleration sensor or longitudinal acceleration sensor. In contrast to the optical or mechanical sensors mentioned above it is the reference point's change in condition of motion that is detected by way of acceleration sensors and not directly its change in position. As such, it is detected whether the reference point is being accelerated or braked, or whether it is moving uniformly or is at rest. The reference point's respective position data then can be determined from the point's change in condition of motion. The advantage of such embodiment is that users, being liberated from a fixed surface, are able to, as it were, write "in the air".

To completely detect the device's movement, it is possible to provide, for example, two translational acceleration sensors and one rotation-angle acceleration sensor on the housing.

It also can be advantageous, depending on the device's intended purpose, to combine one of the cited mechanical or optical sensors with a rotation-angle acceleration sensor.

If the intention is to register a drawing or handwriting using the device according to the present invention, the system may have to be informed when the device's movement corresponds to part of a graphic or writing and when the intention is only to move the "drawing implement" from one location on the virtual user interface to another by moving the device, without leaving behind a "track". This can be achieved by way of, for example, operating parts, such as a key or button, via which the graphical representation of the reference point's position data on the display facility is initiated ("activated"). The device can, in this connection, furthermore include operating parts via which the graphical representation of the reference point's position data on the display facility is terminated. The operating parts for initiating and terminating the display of the position data also can be, for example, one and the same button or one and the same key having two operating statuses, such as depressed and released.

In a further embodiment, the operating parts for initiating and terminating the graphical representation of the position data also can include parts for verifying the device's mechanical contact with a surface of a solid object. Such parts can be, for example, a pressure or contact sensor. The device can then be embodied such that only the reference point's position data intended when contact exists with the surface will be graphically represented on the display facility. This embodiment is intuitively a very easy-to-operate system corresponding as it does to the lowering and raising of a writing implement when drawing or writing.

It can be highly advantageous when operating the device according to the present invention for the data processor to take into consideration a change in the reference point's present position such that the image appearing on the display facility remains substantially stable in terms of location and/or position relative to a fixed reference area. The image appearing on the display facility will, as a result, remain substantially positionally stable relative to the user, thereby improving its readability.

A further advantage of this embodiment of the present invention lies in making it far easier in this way, compared to conventional systems, to handle virtual user interfaces and/or graphics extending beyond the edge of the display element. For instance, in the embodiment shown the display element is displayed, similarly to a "window", across a virtual user interface which is substantially fixed in its position with regard to the user. Operating the graphics and/or user interface and displaying different areas of the graphics and/or user interface are thus combined in a single movement. In conventional systems, graphics and/or parts of the user interface not shown on the display facility have to be brought into the active display area by way of what is termed "scrolling" before they can be further processed. In the case of the present invention, however, it is only necessary to move the device by a required amount in a required direction in order to display an area of the user interface or graphics situated there from the user's viewpoint.

The cited reference area can be, for example, a plane running parallel to the surface of the display facility. The reference area also can be an area running substantially parallel to the surface of a solid object. The image's stability in terms of location and/or position relative to the reference area can be achieved by, for example, the image's imagined projection onto the reference area remaining stable in terms of location and/or position. The imagined projection can be a parallel projection or a point projection proceeding from a point that is fixed relative to the display facility.

Stability in terms of location and/or position can be achieved according to the present invention by the data processor moving the displayed image within the display facility with a complementary movement opposite that of a change in the reference point's present position. This corresponds to the above-mentioned intuitive idea of the movement of a "window" embodied by way of the display facility over a virtual graphic and/or virtual user interface fixed in terms of location.

It may be necessary when operating the system according to the present invention on the one hand to obtain an overview of large areas of the graphic and/or user interface and, on the other hand, to observe or process small areas of the graphic and/or user interface in a detailed manner. It therefore can be advantageous for the device according to the present invention also to include operating parts making it possible to adjust the size relationship between the detected position data and the image of the position data shown on the display facility. This will allow the user to, for instance, "zoom in" on a graphic for the purpose of processing details and to "zoom out" again in order to obtain a general overview.

The background of the above-mentioned point projection for maintaining the stability in terms of location and/or position of the object shown on the display facility can be better explained by way of such "zooming". A point projection proceeds from a reference point which is freely selectable in space. If a user then proceeds, for example, from an image, stable in terms of location and/or position, of an object on a specific reference area, that user will obtain, for example, the representation of the image's outlines on the display facility by determining the intersections of the straight connecting lines between the outlines of the object's image on the reference area with the reference point of the point projection. If the plane of the display facility is located between the reference area and reference point, the representation of an object on the display facility will be smaller than its image on the reference area. If the reference area is located between the plane of the display facility and reference point, the representation of the object on the display facility will be enlarged compared to its image on the reference area.

If a point projection is employed to obtain stability in terms of location and/or position relative to a reference area, "zooming" can be achieved by, for example, changing the position of the reference point and, following from this, differently "calculating" the image shown on the display facility. This can be done using, for instance, the operating parts mentioned. Another possibility for "zooming" is provided in this case by changing the distance between the display facility and reference area.

If a parallel projection is employed to obtain stability in terms of location and/or position relative to a reference area, "zooming" can be simply achieved by using an adjustable scaling factor in calculating the image shown on the display facility. The scaling factor can then be adjusted using, for instance, the operating parts mentioned.

To make it as easy as possible to enter characters, according to the present invention it further can be provided for the data processor to be embodied with character recognition parts which will scrutinize the change, detected by the position detection parts, in the reference point's present position for agreement with pre-specified characters and which, in the event of substantial agreement, will assign at least one character to such position. Character recognition of this type facilitates, in particular, the implementation of small and easily manageable devices that are suitable for entering information since a relatively bulky keyboard can be dispensed with.

It is advantageous, particularly for mobile applications of the device, if the data processing equipment is embodied for cable-linked or cableless communication with a remotely located base. The device can, in this way, be connected to, for instance, another computer or a printer or can be coupled to, for example, a mobile radio network. In the latter case, the data processing equipment may have, for example, radio transmission parts suitable for transmitting detected movements and/or ascertained characters. The device according to the present invention could, in this way, be used to detect messages which can then be forwarded via the radio transmission parts over, for instance, a mobile radio network.

It is desirable, particularly in the case of mobile telecommunication terminals, to improve the hereto rather unsatisfactory possibilities for graphical user prompting, it being particularly advantageous for the device of the present invention to be embodied as a mobile telecommunication terminal. All the above-cited advantages of generating graphics and using graphical user interfaces then could be combined in one telecommunication terminal, thereby substantially enhancing the terminal's user-friendliness and increasing its range of applications.

As already indicated above, it is desirable to employ a method for controlling the device according to the present invention whereby a graphical user interface operated by moving the device is shown on the display facility. In an embodiment of the present invention, it can be provided for at least a part of the graphical user interface to consist of the representation of a keyboard. For character entry purposes, individual characters will then be "accessed" and selected by moving the housing. The selection can be made by, for instance, depressing a special selection key or by actuating a pressure or, as the case may be, contact sensor of the kind already mentioned with reference to detecting graphics. In this way, it is possible to enter texts and characters by a simple way as an alternative to the above-mentioned character recognition.

It can be advantageous, particularly when the device according to the present invention is combined with a telecommunication terminal, for the representation of the keyboard on the user interface to include a telephone keypad. It would be possible in this way to implement, for example, a mobile telecommunication terminal capable of managing without a mechanical keyboard and consequently possessing a much larger display for showing graphics and data while retaining constant structural dimensions.

To operate the device according to the present invention, provision furthermore can be made for employing a method whereby the graphical user interface facilities controlling an arrangement via which objects can be processed in the form of actions and contents, the actions being executable and the contents being capable of being processed by way of such actions. With this method, the objects are spatially arranged within an operating space and are accepted into a string, for which purpose their respective position in the operating space is located.

Additional features and advantages of the present invention are described in, and will be apparent from, the following Detailed Description of the Invention and the Figures.

BRIEF DESCRIPTION OF THE FIGURES

FIG. 3 is a perspective view of the second exemplary embodiment of the device according to the present invention with an operating possibility being shown by way of an illustrated hand.

FIG. 4. is a cross-section of the second exemplary embodiment shown in FIG. 2.

DETAILED DESCRIPTION OF THE INVENTION

Figure 1:
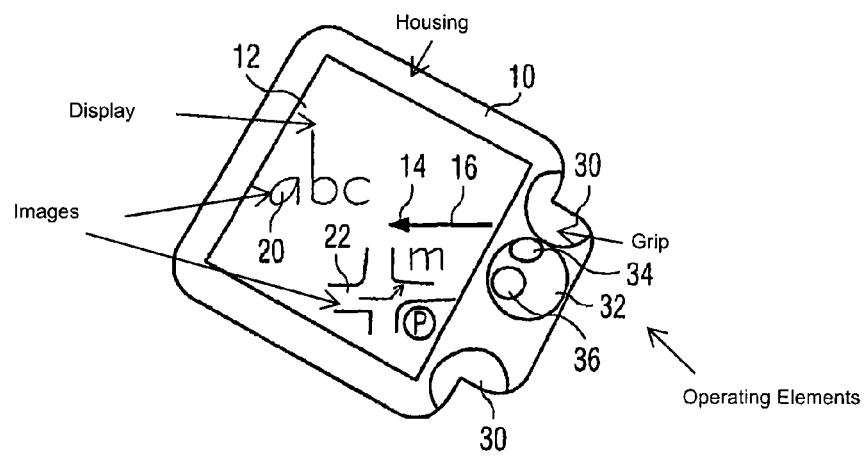
FIG. 1 is a top view of a first exemplary embodiment of the device according to the present invention.

FIG. 1 is a first exemplary embodiment of the device according to the present invention. It includes an approximately square housing 10 on which is located an approximately square display facility 12. Shown on the display facility 12 is a reference point 14 of the device symbolized by the tip of an arrow symbol 16. By way of example, the display facility 12 furthermore shows characters "abc" 20 registered by way of the device or, as the case may be, a drawing 22 registered using of the device according to the present invention.

The housing 10 has two recessed grips 30 at which it can be held with two fingers. Located between the recessed grips 30 is a first operating element 32 on which, in turn are located two further, key-shaped operating elements 34, 36. Such operating elements 34, 36 are function keys via which specific actions can be initiated in the device according to the present invention corresponding to, for example, the known mouse keys located on a computer mouse for the purpose of operating a conventional graphical user interface.

The operating element 32 is stationary in the embodiment shown and is only provided for ergonomic reasons. A zoom factor, possibly requiring to be sestet, can be set by way of, for example, a rotary button, not shown in FIG. 1, situated on the side of the housing. Alternatively, the operating element 32 also can, be rotatable so that it can be used to set the size ratio between the position data shown on the display facility and the actually registered position data ("zooming").

The reference point 14 and, accordingly, the arrow 16 remain stationary on the display facility when the housing 10 is moved and the position sensors, not shown in FIG. 1, located in or on the device measure the change in position. The graphic 20, 22 shown on the display facility 12 is shifted in a correspondingly opposite direction in accordance with the registered movement and with a zoom factor which may have been set. The arrow 16, and hence the reference point 14, thereby can be moved, for example, over the characters or over the drawing or at any other point on the user interface.

If a drawing is to be registered, then according to the above-described method the reference point can be positioned as desired. To start registering the graphic, the operating element 34 is depressed and, with the operating element 34 in the depressed condition, the housing is moved as required, with a line corresponding to the movement being shown on the display facility. If drawing of the line is to be terminated, the operating element 34 is released and the reference point then moved to a new point.

Any drawings or letters can be registered and displayed in this way.

The virtual user interface which possibly may be shown on the display element, also can be operated in the same way. When the reference point 14 has been positioned over a specific element on the user interface, a required action is initiated via one of the keys 34 or 36.

Figure 2:
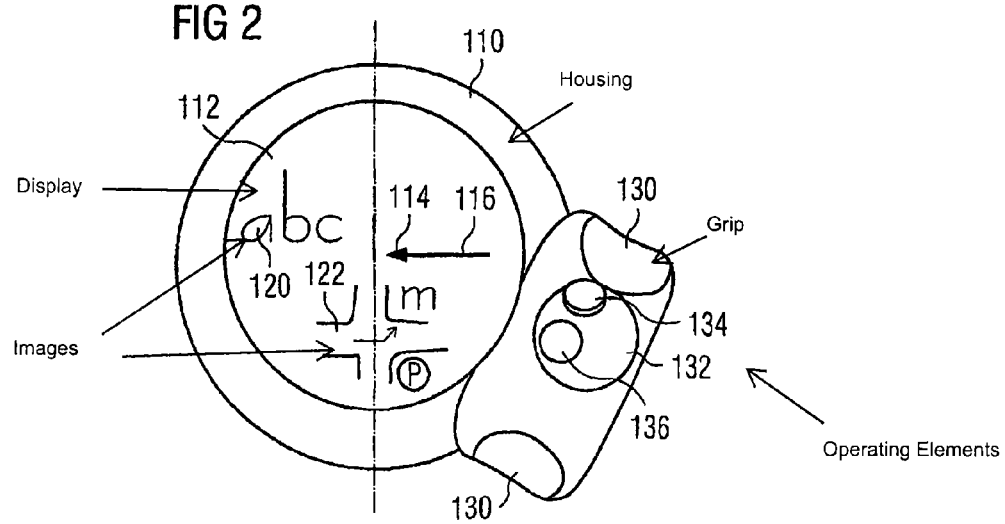
FIG. 2 is a top view of a second exemplary embodiment of the device according to the present invention.

FIG. 2 shows a second exemplary embodiment similar to the first exemplary embodiment shown in FIG. 1, the main difference lying in the housing's round structural design and the round structural design of the display facility 114. Reference numerals corresponding to FIG. 1 have been assigned here, with the reference numerals in FIG. 2 having in each case a 1 placed in front of the corresponding reference numeral in FIG. 1.

The second exemplary embodiment shown in FIG. 2 is shown in FIG. 3 as a perspective view and during operation. FIG. 3 furthermore shows how the device is held by way of the thumb 140 and middle finger 144 of one hand which each grip the device by one of the recessed grips 130. The operating elements 132, 134, and 136 then can be operated with the index finger 142. FIG. 3 further shows the surface 150 of a solid object such as, for instance, a desk.

The movement of the housing 110 relative to the surface 150 can be detected by way of mechanical or optical movement sensors, not shown in FIG. 3, accommodated in the housing 110. Operation of the device shown, in FIG. 3 corresponds to operation of the device shown, by way of example, in FIG. 1.

FIG. 4 shows a cross-section of the second exemplary embodiment shown in FIG. 2 along the dot-and-dash line shown in FIG. 2.

Two ball sensors 172, 174 for registering the movement of the housing 110 are shown in particular. The display facility 112 is provided on the top of the housing 110. The two ball sensors 172, 174 consist of approximately spherical openings 160, 166 on the underside of the housing 110. Located in each opening is a freely rotatable ball 162, 168 whose rolling motion is generally registered by, in each case two sensor elements 164, 170 attached to the housing of which, however, only one 164, 170 is shown in each case in FIG. 4.

If the reference point and the first ball sensor 172 are located in the center of the housing, for example, then the movement registered by way of the first ball sensor 172 will correspond to the movement of the reference point, while the difference between the movements of the second ball sensor 174 and the movement of the first ball sensor 172 will correspond to the rotation of the housing.

Although the present invention has been described with reference to specific embodiments, those of skill in the art will recognize that changes may be made thereto without departing from the spirit and scope of the present invention as set forth in the hereafter appended claims.

The invention claimed is:

1. A device for detecting and displaying movements, comprising:
    a housing;
    a position detection part attached to the housing for detecting housing position data of a reference point of the device when the housing is moved by hand;
    a data processor for processing the housing position data detected by the position detection part, the data processor being embodied with a character recognition facility scrutinizing the housing position data for a change in position of the reference point for agreement with a pre-specified character and which, upon the character recognition facility determining substantial agreement between the housing position data and the pre-specified character, assigns the pre-specified character to a position; and
    a display facility provided on the housing for displaying a first image indicative of the housing position data and a second different image indicative of the pre-specified character corresponding to the housing position data in the event of substantial agreement with the pre-specified character.

2. The device for detecting and displaying movements as claimed in claim 1, wherein the position detection part includes at least one optical sensor, at least one mechanical sensor and at least one acceleration sensor.

3. The device for detecting and displaying movements as claimed in claim 2, wherein the at least one optical sensor includes an optical movement sensor for detecting a translational movement of the reference point.

4. The device for detecting and displaying movements as claimed in claim 2, wherein the at least one optical sensor detects a rotational movement around an axis extending through the reference point.

5. The device for detecting and displaying movements as claimed in claim 2, wherein the device includes at least two optical sensors.

6. The device for detecting and displaying movements as claimed in claim 2, wherein the at least one mechanical sensor is a ball sensor for detecting a rolling movement on a surface.

7. The device for detecting and displaying movements as claimed in claim 2, wherein the at least one acceleration sensor includes at least one of a rotation-angle acceleration sensor and a longitudinal acceleration sensor for detecting an acceleration of the reference point of the device.

8. The device for detecting and displaying movements as claimed in claim 2, wherein the device includes two translational acceleration sensors and one rotation-angle acceleration sensor.

9. The device for detecting and displaying movements as claimed in claim 2, wherein the device includes at least one rotation-angle acceleration sensor.

10. The device for detecting and displaying movements as claimed in claim 1, further comprising an operating part via which the image indicative of the housing position data is initiated and terminated.

11. The device for detecting and displaying movements as claimed in claim 1, further comprising a part for verifying contact with a surface of a solid object, wherein the data processor graphically displays the image indicative of the housing position data when there is contact with the surface of the solid object on the display facility.

12. The device for detecting and displaying movements as claimed in claim 1, wherein the data processor takes account of a change in the position of the reference point such that the image indicative of the housing position data is substantially stable in terms of at least one of location and position relative to a fixed reference area.

13. The device for detecting and displaying movements as claimed in claim 12, wherein the reference area is a plane running substantially parallel to a surface of the display facility.

14. The device for detecting and displaying movements as claimed in claim 12, wherein the reference area is substantially parallel to a surface of a solid object.

15. The device for detecting and displaying movements as claimed in claim 12, wherein to obtain stability of the image indicative of the housing position data in terms at least one of location and position relative to the reference area, the data processor moves the image indicative of the housing position data within the display facility with a complementary movement opposite that of a change in the position of the reference point.

16. The device for detecting and displaying movements as claimed in claim 1, further comprising an operating part via which a size relationship between the housing position data and the image indicative of the housing position data is adjusted.

17. The device for detecting and displaying movements as claimed in claim 1, wherein the data processor includes a microprocessor.

18. The device for detecting and displaying movements as claimed in claim 1, further comprising a part for at least one of cable-linked communication and cable-less communication with a remotely located base.

19. The device for detecting and displaying movements as claimed in claim 18, further comprising a radio transmission part for transmitting at least one of the housing position data and the pre-specified character.

20. The device for detecting and displaying movements as claimed in claim 1, wherein the device is a mobile telecommunication terminal.

21. The device for detecting and displaying movements as claimed in claim 1, wherein a graphical user interface operated by moving the device is shown on the display facility.

22. The device for detecting and displaying movements as claimed in claim 21, wherein the graphical user interface includes a representation of a keyboard.

23. The device for detecting and displaying movements as claimed in claim 22, wherein the representation of the keyboard includes a representation of a telephone keypad.

24. The device for detecting and displaying movements as claimed in claim 21, wherein the graphical user interface facilitates controlling an arrangement such that objects may be processed by the arrangement as actions and contents, the actions being executable and the contents being capable of being processed via the actions, wherein the objects are spatially arranged within an operating space, and wherein the objects are accepted into a string, for which purpose respective positions of the objects in the operating space are located.

25. The device for detecting and displaying movements as claimed in claim 1, wherein displaying the image indicative of the housing position data and the image indicative of the pre-specified character includes simultaneously displaying the image indicative of the housing position data and the image indicative of the pre-specified character.

* * * * *